June 3, 1930.  C. S. McKINLEY  1,760,877
CELLULAR SCREEN
Filed June 2, 1927
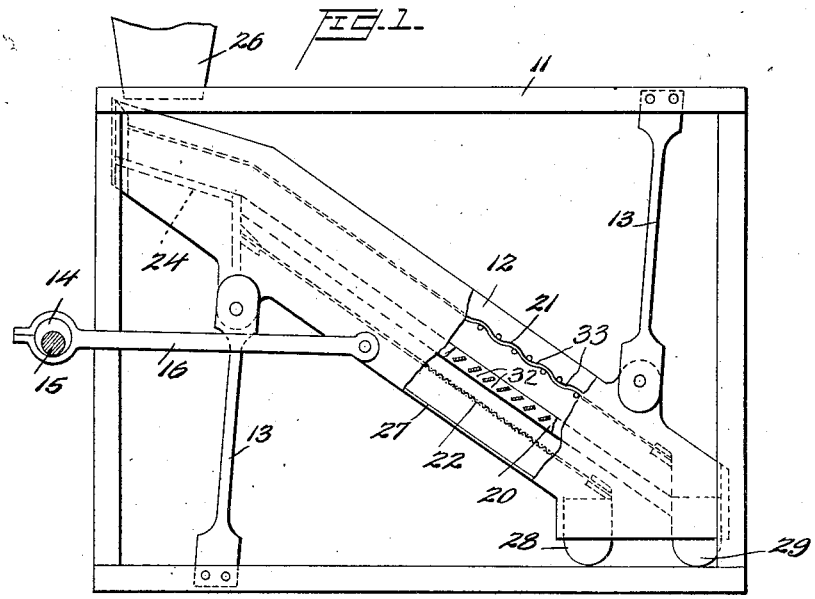
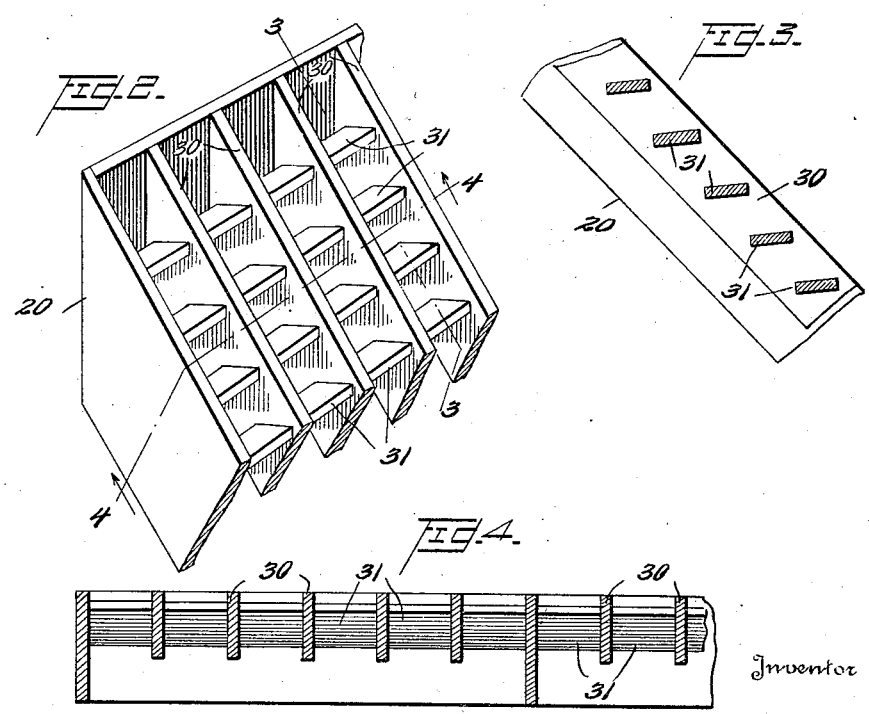

Patented June 3, 1930

1,760,877

UNITED STATES PATENT OFFICE

CARL S. McKINLEY, OF DALLAS, TEXAS

CELLULAR SCREEN

Application filed June 2, 1927. Serial No. 196,058.

This invention relates to apparatus for separating material of a certain relative uniform size from material of larger size or of different conformation. More particularly, the invention relates to apparatus for separating refuse from cotton seed.

During the past several years, particularly in certain states where labor for harvesting cotton is scarce, the process termed "sledding", has been employed in gathering the seed cotton in the fields. According to this method of harvesting, a small cart, or sled having teeth, fingers, notches or tynes on the front edge thereof, is drawn along the ground so that the trunks or stalks of the plants slip between the teeth; and the sled in passing over the plant, gathers not only the seed cotton which is desired, but bolls, leaves, twigs, stems and other foreign material which are not desired. This mass is transported to the ginnery. There the foreign matter is partially removed by a series of cleaners, and the seed cotton with a small quantity of sticks, bolls and leaf trash is delivered to the cotton gin proper. This machine removes the lint; the seed and the larger portion of the refuse falling into conveyors that carry them to bins or storage houses, whence it is removed and delivered to cotton seed oil mills or saved for planting.

The numerous reels, shakers, blowers and aspirators now in use, do not remove the sticks and twigs from the seed in the cleaning process, since such particles have practically the same specific weight as the seed and in cross section are small enough to pass end-wise through screen openings with the seed. These sticks range from the larger stems the size of a pencil down to smaller twigs one-sixteenth of an inch in diameter, and about one inch long on an average; smaller than this, they can be blown or aspirated away from or out of the seed in the ordinary process of cleaning.

The principal object of this invention therefore, is to provide screening apparatus which will remove elongated sticks or twigs from particles of less elongated shape. Another object is to provide such apparatus which will be simple, cheap, easily assembled and conveniently operated. I have found by tests, that when such mixed material as that described is passed downwardly over an inclined screen, the longer particles may be separated if the screen is provided with a plurality of cells or apertures having walls which have a different inclination from that of the body of the screen. By this arrangement the elongated objects can not enter the cells if they are passing down the screen with their axes parallel to the inclined length of the screen. And, if the transverse divisions between the cells are made close enough, the elongated objects can not enter the cells if they are passing down the surface of the screen with their axes disposed transversely. The small particles such as the cotton seed, however, drop into the cells and pass out of the lower ends thereof, in a direction opposite to that of the inclination of the screen. If the screen is vibrated while the material is passing over it, the separation is greatly expedited.

In the drawings which illustrate one embodiment of this invention, Figure 1 is a side elevation partly in section of an apparatus according to this invention; Figure 2 is a perspective view of the improved screen proper; Figure 3 is a vertical section of the screen taken on the line 3—3 of Figure 2; and Figure 4 is a transverse section of the screen taken on the line 4—4 of Figure 2.

Referring more particularly to the drawings wherein like reference characters refer to like parts throughout the several views, it will be seen that the apparatus is supported upon a frame 11, which may be made of wood or steel bars, depending upon the size of the apparatus desired. A screen frame 12, is carried upon the frame 11 by supporting means, such as flexible splints 13, attached at one end to the screen frame and bolted at the other end to portions of the rigid frame 11. The particular type of supporting means illustrated and herein described, may of course, be replaced by any other type of suitable supporting means which is capable of permitting the screen frame to have vibratory movement. Vibration is imparted to the screen frame, preferably in a generally horizontal direction, by an eccentric 14, turned by a shaft 15, and connected with the sides of the screen frame by a rod 16.

Within the screen frame 12, there are arranged a cellular screen 20, an upper foraminous screen plate 21 above the cellular screen 20, and a lower foraminous plate 22 below the cellular screen. The apertures in both the cellular screen and the foraminous plates, indicated at 32 and 33 respectively, are of substantially the correct size to pass the largest sizes of the particles to be separated, found in practice to be from seven-eighths of an inch to seven-sixteenths of an inch clear opening between the blades 30—30 and the ribs 31—31. The cellular screen and the plates, as will be noted from the drawings, are arranged at an angle to the horizontal. The most favorable angle of inclination has been found to be about 25°. At the upper end of the cellular screen, a slightly inclined floor 24, is secured within the screen frame beneath the upper foraminous plate. Directly above the floor 24, a hopper 26 for feeding unscreened material is located. A bottom 27, is arranged below the lower plate 22. A gutter 28, takes material from the bottom 27, and passes it to a receptacle of any desired type. A second gutter 29, is arranged at the lower end of the upper plate for taking refuse therefrom. Here it is to be noted that the upper side of the gutter 29 is open to the upper surface of the cellular screen 20 so that it will receive any material which reaches the lower end of the same. Both gutters 28 and 29 are inclined transversely from one side of the screen frame to the other in well known manner so as to discharge material from their lower ends.

The cellular screen 20, may be made in any desired manner. As shown, a plurality of spaced ribs 30 are arranged along the length of the screen; between these ribs a plurality of transverse spaced blades or slats 31 are secured. These ribs 30 and blades 31 cooperate to form a plurality of rows of apertures or cells 32. The apertures formed by the blades and ribs are, as stated above, of substantially the proper size of about the dimensions mentioned just to pass the material to be screened. The blades 31, as clearly shown in the drawings (particularly Figure 3) have a slight rearward slope, that is, they are sloped in the opposite direction from the body of the screen. If desired, the slope may be made greater than that shown. The blades, as shown in Figures 1 and 3, are substantially non-overlapping, but each has sufficient width of surface to clearly catch the particles falling thereon as they move from the upper blade 21 or downwardly along the upper surface of the cellular screen itself. After being caught upon the upper surface of the blades 31, that is, upon the lower surface of the cells, the particles are discharged out of the lower or rear end of the cells due to the vibrating movement of the screen. Such elongated objects as pass end-wise through over the openings of the upper plate 21 will not pass fairly through the cells of the cellular screen. Vibration of the screen causes such elongated objects to fall flat upon the upper surface of the screen. In this position they can not enter the reversely opening cells thereof, and will be discharged at the lower end of the screen into the gutter 29. The floor 24 at the head of the screen serves to cause such elongated objects as initially enter from the chute 26 to assume an approximately horizontal position before passing to the screen. In Figures 1 and 3 the longitudinal ribs 30 are shown as extending somewhat above the plane of the tops of the blades 31.

The operation of the device will be clear from the above detailed description, so that no particular description of operation is believed to be necessary. Only one form of the invention has been particularly described, but various other forms of the invention will suggest themselves to those skilled in the art from a consideration of the above disclosure. Applicant, therefore, wishes it to be clearly understood that the invention is not to be limited except by the proir art and the scope of the appended claims.

Having thus described the invention, what is claimed as new and desired to be secured by Letters Patent is:

1. A separating apparatus including in combination, an inclined cellular screen, the cell walls of said screen being rearwarldy inclined with respect to the body of said screen, an inclined imperforate floor carried by the upper ends of said screen, means to feed material onto said inclined floor, means to remove screened material from beneath said cellular screen, and means to impart vibratory movement to said cellular screen and floor.

2. In a separating device an inclined cellular screen comprising a plurality of spaced transverse blades, said blades being substantially non-overlapping and rearwardly inclined with respect to the body of the screen, and a plurality of spaced longitudinal ribs extending above the plane of the tops of the blades and forming together with said blades a plurality of rows of separate cells of approximately the correct size for passing the particles to be separated.

In testimony whereof I hereunto affix my signature.

CARL S. McKINLEY.